(12) United States Patent
Hotra et al.

(10) Patent No.: US 10,108,531 B2
(45) Date of Patent: *Oct. 23, 2018

(54) TRANSFERRING APPLICATION SOFTWARE FROM A PHYSICAL TO A VIRTUAL COMPUTER SYSTEM

(71) Applicant: The Boeing Company, Chicago, IL (US)

(72) Inventors: Jonathan Nicholas Hotra, Maryland Heights, MO (US); Murali Rangarajan, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 225 days.

This patent is subject to a terminal disclaimer.

(21) Appl. No.: 15/145,423

(22) Filed: May 3, 2016

(65) Prior Publication Data

US 2017/0322870 A1 Nov. 9, 2017

(51) Int. Cl.
*G06F 11/00* (2006.01)
*G06F 11/36* (2006.01)
*G06F 11/34* (2006.01)
*G06F 11/30* (2006.01)

(52) U.S. Cl.
CPC ...... *G06F 11/3664* (2013.01); *G06F 11/3013* (2013.01); *G06F 11/3428* (2013.01); *G06F 11/3612* (2013.01)

(58) Field of Classification Search
CPC ............. G06F 11/3664; G06F 11/3013; G06F 11/3428; G06F 11/3612
See application file for complete search history.

(56) References Cited

U.S. PATENT DOCUMENTS

| 8,423,986 B1 | 4/2013 | Grechanik |
| 9,009,677 B2 | 4/2015 | Zhao et al. |
| 9,170,831 B2 | 10/2015 | Robinson et al. |
| 9,424,065 B2 | 8/2016 | Singh et al. |

(Continued)

OTHER PUBLICATIONS

Hotra et al., "Testing Application Programs Using a Virtual Machine," U.S. Appl. No. 15/145,318, filed May 3, 2016, 61 pages.

(Continued)

*Primary Examiner* — Jason B Bryan
(74) *Attorney, Agent, or Firm* — Yee & Associates, P.C.

(57) ABSTRACT

A method and apparatus for testing application software for installation on hardware platforms. A software tool is verified using a tool qualifier module running on a physical computer system that has a processor of a first processor type and an operating system of a first operating type. A benchmark performance is established for the physical computer system. A virtual machine in a virtual computer system is verified using a qualifier module to determine whether its performance is consistent with the benchmark performance to form a qualified virtual machine. The virtual computer system has a configuration that comprises a processor of a second type; an operating system of a second operating type; the virtual machine emulating the processor of the first processor type; and an operating system of the first operating type. The software tool can be transferred from the physical computer system to the qualified virtual machine without requiring requalification.

19 Claims, 11 Drawing Sheets

(56) References Cited

U.S. PATENT DOCUMENTS

| | | |
|---|---|---|
| 2008/0229227 A1 | 9/2008 | Bantz et al. |
| 2009/0070742 A1 | 3/2009 | Voruganti |
| 2009/0319256 A1 | 12/2009 | Chow et al. |
| 2009/0320011 A1 | 12/2009 | Chow et al. |
| 2010/0017185 A1 | 1/2010 | Bade et al. |
| 2010/0122248 A1 | 5/2010 | Robinson et al. |
| 2010/0153924 A1* | 6/2010 | Andrews .............. G06F 11/3688 717/126 |
| 2012/0180027 A1 | 7/2012 | Yu et al. |
| 2013/0055250 A1* | 2/2013 | Pechanec ............ G06F 11/3428 718/1 |
| 2015/0094150 A1 | 4/2015 | Gregory et al. |
| 2015/0220367 A1 | 8/2015 | Hotra et al. |
| 2015/0370692 A1 | 12/2015 | Tsirkin et al. |
| 2016/0253284 A1 | 9/2016 | Cappaert et al. |
| 2016/0254982 A1 | 9/2016 | Kuznetsov et al. |
| 2016/0342488 A1 | 11/2016 | Lim et al. |
| 2017/0212789 A1 | 7/2017 | Vega |
| 2017/0228311 A1* | 8/2017 | Lee ..................... G06F 11/3688 |
| 2017/0322868 A1 | 11/2017 | Hotra et al. |
| 2017/0322869 A1 | 11/2017 | Hotra et al. |

OTHER PUBLICATIONS

Hotra et al., "Testing Application Software Between Virtual Machines," U.S. Appl. No. 15/145,372, filed May 3, 2016, 62 pages.

Brosgol, "Safety and Security: An Analysis of Certification Issues and Technologies for High-Integrity Software," AdaCore, Apr. 2009, 59 pages.

Brosgol et al., "Trusting the tools: An agile approach to tool qualification for D0-178C," Military Embedded Systems, Mar. 2012, 7 pages, accessed Oct. 30, 2015. http://mil-embedded.com/articles/trusting-tools-agile-approach-tool-qualification-do-178c/.

"Atego Modeler 8.1," Atego—a wholly owned subsidiary of PTC Inc., copyright 2010-2015, 135 pages, accessed Oct. 30, 2015. http://www.atego.com/campaigns/mm.

Office Action, dated Nov. 8, 2017, regarding U.S. Appl. No. 15/145,372, 14 pages.

Office Action, dated Jan. 11, 2018, regarding U.S. Appl. No. 15/145,318, 38 pages.

Notice of Allowance, dated Jan. 22, 2018, regarding U.S. Appl. No. 15/145,372, 5 pages.

Final Office Action, dated Jul. 24, 2018, regarding U.S. Appl. No. 15/145,318, 41 pages.

\* cited by examiner

TRANSFERRING APPLICATION SOFTWARE FROM A PHYSICAL TO A VIRTUAL COMPUTER SYSTEM

CROSS-REFERENCE TO RELATED APPLICATIONS

This application is related to the following patent applications: entitled "Testing Application Programs Using a Virtual Machine", application Ser. No. 15/145,318; and entitled "Transferring Application Software Between Virtual Machines", application Ser. No. 15/145,372, issued a Notice of Allowance on Jan. 22, 2018 allowing claims 1-18; both applications filed even date hereof and assigned to the same assignee. Each of the aforementioned applications is incorporated herein by reference in its entirety.

BACKGROUND INFORMATION

1. Field

The present disclosure relates generally to application programs and, in particular, to testing application programs. Still more particularly, the present disclosure relates to a method and apparatus for testing application programs using application testing tools that are run on virtual machines.

2. Background

Many different types of complex systems are operated using application programs that require certification by one or more agencies. For example, without limitation, commercial aircraft, military aircraft, spacecraft, autonomous vehicles, nuclear power plants, medical equipment, and other types of complex systems require certification of different application programs. However, as application programs increase in size and complexity, it becomes increasing difficult to manually test these application programs and then verify that the results of this testing are accurate and complete.

Consequently, the testing and analysis of testing results are increasingly being performed through automated processes involving specialized computer programs, which may be referred to as application testing tools. But these application testing tools may themselves be a source of error that leads to testing results that are inaccurate, incomplete, or both.

Thus, these application testing tools may need to be verified and validated before they can be used to test application programs. For example, without limitation, before an application testing tool may be used on a particular hardware configuration to test an application program, the application testing tool may need to be qualified. Qualifying the application testing tool ensures that the application testing tool behaves as specified under all operational conditions. For example, an application testing tool may be qualified by verifying that the application testing tool meets all expected requirements when the application testing tool is run using a particular hardware and software configuration.

However, given the rate that computer hardware and software is evolving, it may be difficult to establish and maintain specific hardware configurations for running the application testing tools used to test application programs. In particular, requalifying an application testing tool after modifications, upgrades, or replacements have been made with respect to the original hardware and software configuration used to qualify the application testing tool, may be more difficult, time-consuming, and expensive than desired. Therefore, it would be desirable to have a method and apparatus that take into account at least some of the issues discussed above, as well as other possible issues.

SUMMARY

In one illustrative embodiment, an apparatus comprises a tool qualifier module, a physical computer system, a virtual computer system, a benchmark module, and a qualifier module. The physical computer system comprises a first processor of a first processor type and a first operating system of a first operating type running on the first processor of the first processor type. The tool qualifier module is run on the physical computer system to verify an application testing tool using tool qualification data to qualify the application testing tool. The benchmark module establishes a benchmark performance for the physical computer system. The virtual computer system has a configuration that comprises a second processor of a second processor type; a second operating system of a second operating type running on the second processor of the second processor type; a virtual machine emulating the first processor of the first processor type and running on the second processor of the second processor type; and a third operating system of the first operating type running on the virtual machine. The qualifier module is used for verifying the virtual machine to determine whether the performance of the virtual machine is consistent with the benchmark performance of the physical computer system within selected tolerances to thereby form a qualified virtual machine such that transferring the application testing tool after the application testing tool has been qualified from the physical computer system to the qualified virtual machine on the virtual computer system does not require requalifying the application testing tool.

In another illustrative embodiment, a method is provided for testing application software for installation on a hardware platform using virtual computer systems. An application testing tool is verified using a tool qualifier module running on a physical computer system having a first processor of a first processor type and a first operating system of a first operating type running on the first processor of the first processor type. A benchmark performance is established for the physical computer system. A virtual machine in a virtual computer system is verified using a qualifier module to determine whether a performance of the virtual machine is consistent with the benchmark performance of the physical computer system within selected tolerances to thereby form a qualified virtual machine. The virtual computer system has a configuration that comprises a second processor of a second processor type; a second operating system of a second operating type running on the second processor of the second processor type; the virtual machine emulating the first processor of the first processor type and running on the second processor of the second processor type; and a third operating system of the first operating type running on the virtual machine. After the application testing tool has been qualified on the physical computer system, the application testing tool is transferred from the physical computer system to the qualified virtual machine on the virtual computer system. Using the application testing tool on the second virtual computer system to test an application program that is to be installed on the hardware platform does not require requalifying the application testing tool.

In yet another illustrative embodiment, a method is provided for testing application software for installation on an aircraft hardware platform using virtual computer systems. An application testing tool is qualified using a tool qualifier module running on a physical computer system having a first processor of a first processor type and a first operating system of a first operating type running on the first processor of the first processor type. A benchmark performance is established for the physical computer system. The virtual computer system has a configuration that comprises a second processor of a second processor type; a second operating system of a second operating type running on the second processor of the second processor type; the virtual machine emulating the first processor of the first processor type and running on the second processor of the second processor type; and a third operating system of the first operating type running on the virtual machine. The virtual machine in the virtual computer system is verified using a qualifier module to determine whether the performance of the virtual machine is consistent the benchmark performance of the physical computer system within selected tolerances to thereby form a qualified virtual machine. After the application testing tool has been verified, the application testing tool is transferred from the physical computer system to the qualified virtual machine on the virtual computer system. Using the application testing tool on the virtual computer system to test an application program that is to be installed on the aircraft hardware platform does not require requalifying the application testing tool. An application program is tested for installation on the aircraft hardware platform using the application testing tool running on the virtual computer system to determine whether the application program is certifiable without requalifying the application testing tool for use on the virtual computer system. The application program is installed on the aircraft hardware platform in response to a determination that the application program is certifiable.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
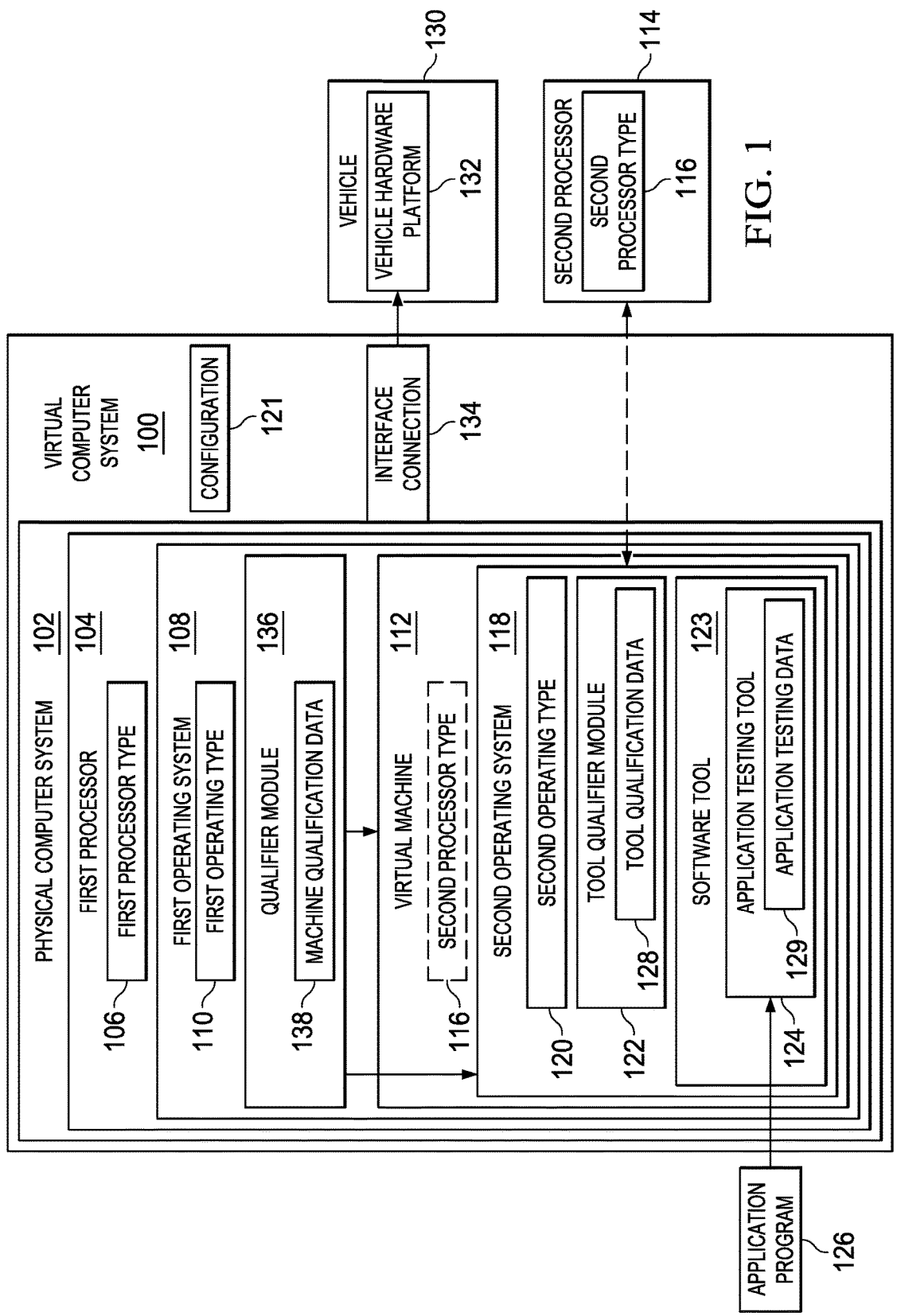
FIG. 1 is an illustration of a virtual computer system in the form of a block diagram in accordance with an illustrative embodiment.

The illustrative embodiments take into account different considerations. In particular, the illustrative embodiments take into account that it may be desirable to qualify an application testing tool that is used to test application programs and to tie that qualification to a particular computer hardware and software configuration used to perform the qualification. Tying this qualification to the computer hardware and software configuration may avoid the risk of errors that may be introduced due to a hardware change or a software change.

The illustrative embodiments take into account that many different software patches and software upgrades may be implemented over the life of a system that is in service for many years or even many decades. For example, without limitation, many different application programs may be installed on an aircraft over the life of the aircraft. In some cases, the application testing tools used to test these application programs at the beginning of the life of an aircraft may be unable to run on the new hardware and software later in the life of the aircraft. In some case, the original hardware and software configuration used to qualify an application testing tool at the beginning of the life of the aircraft may be unavailable later in the life of the aircraft. Further, recreating this original hardware and software configuration may be impossible later in the life of the aircraft.

Thus, the illustrative embodiments provide a method and apparatus for easily and quickly qualifying and requalifying application testing tools using virtual machines. In particular, the application testing tools are hosted on virtual machines that are configured to emulate baseline hardware and software configurations in a manner that is unaffected by inevitable changes in the hardware and software of physical computer systems that occur over time. In this manner, the illustrative embodiments provide a virtual machine configured to allow for software tools, such as an application testing tool, to be executed in the virtual machine in a manner that produces guaranteed, consistent results across a variety of physical computer system hosts. The illustrative embodiments provide a virtual machine for tool qualification that eliminates the need to maintain a particular hardware configuration for a long period of time, such as decades, or to requalify an application testing tool each time the application testing tool is used on a physical computer system having a new hardware configuration.

Further, the illustrative embodiments provide a method and apparatus that reduces the overall time, effort, and cost associated with requalifying application testing tools, which have already been qualified on a virtual machine running on a first hardware configuration, on that same virtual machine running on a second hardware configuration. In particular, only a verification of the equivalence between the virtual machine running on the first hardware configuration and the virtual machine running on the second hardware configuration needs to be performed. Once verification of the virtual machine running on the second hardware configuration has been satisfactorily performed, this verification will automatically apply to all software that is run on the virtual machine. In other words, the application testing tools that were previously qualified for the virtual machine running on the first hardware configuration will not need to be individually requalified for the virtual machine running on the second hardware configuration.

Referring now to the figures, the same reference numeral may be used in more than one figure. This reuse of a reference numeral in different figures represents the same element in the different figures.

With reference to FIG. 1, an illustration of a virtual computer system is depicted in the form of a block diagram in accordance with an illustrative embodiment. In this illustrative example, virtual computer system 100 comprises physical computer system 102 that includes first processor 104 of first processor type 106. First operating system 108 of first operating type 110 may be run on first processor 104 of first processor type 106. In some cases, an operating type, such as first operating type 110, may be referred to as an operating system type.

Virtual computer system 100 also comprises virtual machine 112 that is run on first processor 104. Virtual machine 112 emulates second processor 114 of second processor type 116. In particular, virtual machine 112 emulates hardware and software in a manner that allows emulation of second processor 114 of second processor type 116.

In this manner, virtual machine 112 contains an emulation of second processor 114 of second processor type 116. In one illustrative example, second processor 114 may be referred to as a baseline processor and second processor type 116 may be referred to as a baseline processor type.

Second operating system 118 of second operating type 120 may be run on virtual machine 112. In particular, virtual machine 112 is a computer program that allows simulation of the execution of second operating system 118 of second operating type 120 and, in some cases, one or more other programs, by second processor 114 emulated in the virtual machine running on first processor 104 of physical computer system 102.

In these illustrative examples, virtual machine 112 is configured to run in virtual time. In particular, virtual machine 112 may be run in virtual time, independently of any physical clock or processor-based clock in physical computer system 102.

In one illustrative example, first processor type 106 is different from second processor type 116. Further, in this illustrative example, first operating type 110 is different from second operating type 120. For example, without limitation, first processor type 106 and second processor type 116 may belong to different processor families, may be different releases, may comprise different processor architectures, may be different models, may be different generations of a processor, may be built by different manufacturers, may be different in some other way, or a combination thereof.

Similarly, first operating type 110 and second operating type 120 may belong to different operating system families, may be different releases, may comprise different operating system architectures, may be different models, may be different generations of an operating system, may be developed by different software developers, may be different in some other way, or a combination thereof.

As another example, without limitation, second processor type 116 may be newer than or belong to a newer generation of processor types than first processor type 106. Similarly, second operating type 120 may be newer than or belong to a newer generation of operating system types than first operating type 110.

Together, the physical layer defined by first processor type 106 and first operating type 110 and the virtual layer defined by second processor type 116 and second operating type 120 define configuration 121 of virtual computer system 100. Thus, configuration 121 is a hardware and software configuration composed of both a physical layer and a virtual layer.

Virtual machine 112 is run as an emulation of a baseline hardware and software configuration entirely through software. This emulation is configured to be unaffected by future changes in the hardware and software of physical computer system 102 over time. For example, without limitation, virtual machine 112 may be adapted and modified over time to be compatible with different physical computer systems having different hardware and software configurations without the emulation of the baseline hardware and software configuration by virtual machine 112 being unaffected.

Tool qualifier module 122 may be run on virtual machine 112 using second operating system 118 to perform verification of software tool 123. In some cases, tool qualifier module 122 may also be used to perform validation of software tool 123. Software tool 123 may be any software tool that is configured for use in testing, creating, developing, or otherwise using application program 126. Software tool 123 may take a number of different forms such as, but not limited to, an application testing tool, a compiler tool, a developer tool, or some other type of tool. In one illustrative example, software tool 123 takes the form of application testing tool 124. Performing this verification includes confirming that application testing tool 124 satisfies all expected requirements for application testing tool 124. Application testing tool 124 may be used to, for example, without limitation, create and develop the program code for application program 126.

In particular, tool qualifier module 122 may verify application testing tool 124 to qualify application testing tool 124 for use in testing application program 126. In particular, tool qualifier module 122 is used to verify application testing tool 124 before application testing tool 124 is run on virtual machine 112 using second operating system 118 to test application program 126. Application program 126 may be a new computer program, a software patch, a software upgrade, or some other type of computer program that is to be installed on a hardware platform.

In these illustrative examples, tool qualifier module 122 verifies application testing tool 124 using tool qualification data 128 to qualify that application testing tool 124 runs on virtual machine 112 in accordance with all expected requirements. Tool qualification data 128 may include at least one of tool source data, regression test input data, regression test output data, or some other type of data.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

Application testing tool 124 may be run on virtual machine 112 using second operating system 118 to determine whether application program 126 is certifiable. In one illustrative example, application testing tool 124 tests whether application program 126 provides expected output data in response to a particular set of inputs to application program 126, to determine whether application program 126 is certifiable. In some cases, application testing tool 124 uses application testing data 129 to test application program 126. Application testing data 129 may include at least one of application source code, regression test input data, regression test output data, or some other type of data.

Hosting application testing tool 124 on virtual machine 112 allows application testing tool 124 to be run on physical computer system 102 independently of first processor 104 and first operating system 108. Running virtual machine 112, which emulates second processor 114 of second processor type 116 on first processor 104 of first processor type 106, enables execution of application testing tool 124 through second operating system 118 of second operating type 120 running on virtual machine 112 even when application testing tool 124 is incapable of functioning correctly using first operating system 108 of first operating type 110 and when second operating type 120 of second operating system 118 is incompatible with first processor type 106 of first processor 104.

Application program 126 is designed for use on a hardware platform that is either connected to or embedded within a complex system. This complex system may take the form of, for example, without limitation, a vehicle, an autonomous vehicle, a nuclear power plant, a medical device, or some other type of system. In one illustrative example, the complex system is vehicle 130 and application program 126 is designed for use on vehicle hardware platform 132 onboard vehicle 130.

In some illustrative examples, virtual computer system 100 includes interface connection 134 to vehicle hardware platform 132. Vehicle hardware platform 132 may take the form of one of an aircraft hardware platform, a spacecraft hardware platform, a watercraft hardware platform, a ground vehicle hardware platform, or some other type of vehicle hardware platform.

Interface connection 134 allows for easy transfer of application program 126 from virtual computer system 100 onto vehicle hardware platform 132 for installation. As one illustrative example, in response to the satisfactory testing of application program 126 by application testing tool 124, second operating system 118 may output application program 126 over interface connection 134 to vehicle hardware platform 132 for installation. For example, if application testing tool 124 determines that application program 126 is certifiable, application testing tool 124 may generate a certification result indicating that application program 126 is approved for installation on the hardware platform.

Depending on the implementation, interface connection 134 is implemented as either part of physical computer system 102 or connected to physical computer system 102. Further, depending on the implementation, interface connection 134 may be used to establish a wireless, wired, optical, or other type of connection between virtual computer system 100 and vehicle hardware platform 132. Interface connection 134 is made available to second operating system 118 through virtual machine 112. In other illustrative examples, application program 126 may be installed on vehicle hardware platform 132 in some other manner.

In some illustrative examples, qualifier module 136 is run on first processor 104 outside of virtual machine 112. Qualifier module 136 may be used to perform verification of virtual machine 112. In particular, qualifier module 136 may use machine qualification data 138 to verify that virtual machine 112 functions according to expected requirements while virtual machine 112 runs second operating system 118 on first processor 104. Machine qualification data 138 may include at least one of machine source data, regression test input data, regression test output data, or some other type of data.

Using virtual machine 112 to perform the verification and, in some cases, validation, of application testing tool 124 eliminates the need to maintain a physical computer system having a baseline hardware and software configuration. In this manner, virtual machine 112 that emulates second processor 114 of second processor type 116 may persist for tool qualification even after the physical hardware platform or physical hardware components used to implement processors of second processor type 116 becomes obsolete. Virtual machine 112 may persist, for example, without limitation, for decades, but a particular hardware platform may become obsolete in only a few years.

In one illustrative example, virtual machine 112 is stored in the form of one or more software files in some type of data storage. For example, without limitation, virtual machine 112 may be stored as one or more software files in cloud storage. Virtual machine 112 may be downloadable onto different physical host computer systems for use in qualifying application testing tools. Virtual machine 112 may not require any maintenance over the years even though the hardware configurations of the physical host computer systems may change over time.

In some illustrative examples, virtual machine 112 may be referred to as a tool qualification virtual machine. Running tool qualifier module 122 on virtual machine 112, which is running on first processor 104 of physical computer system 102, transforms physical computer system 102 into virtual computer system 100 that is a special-purpose computer system for performing tool qualification and application testing.

Figure 2:
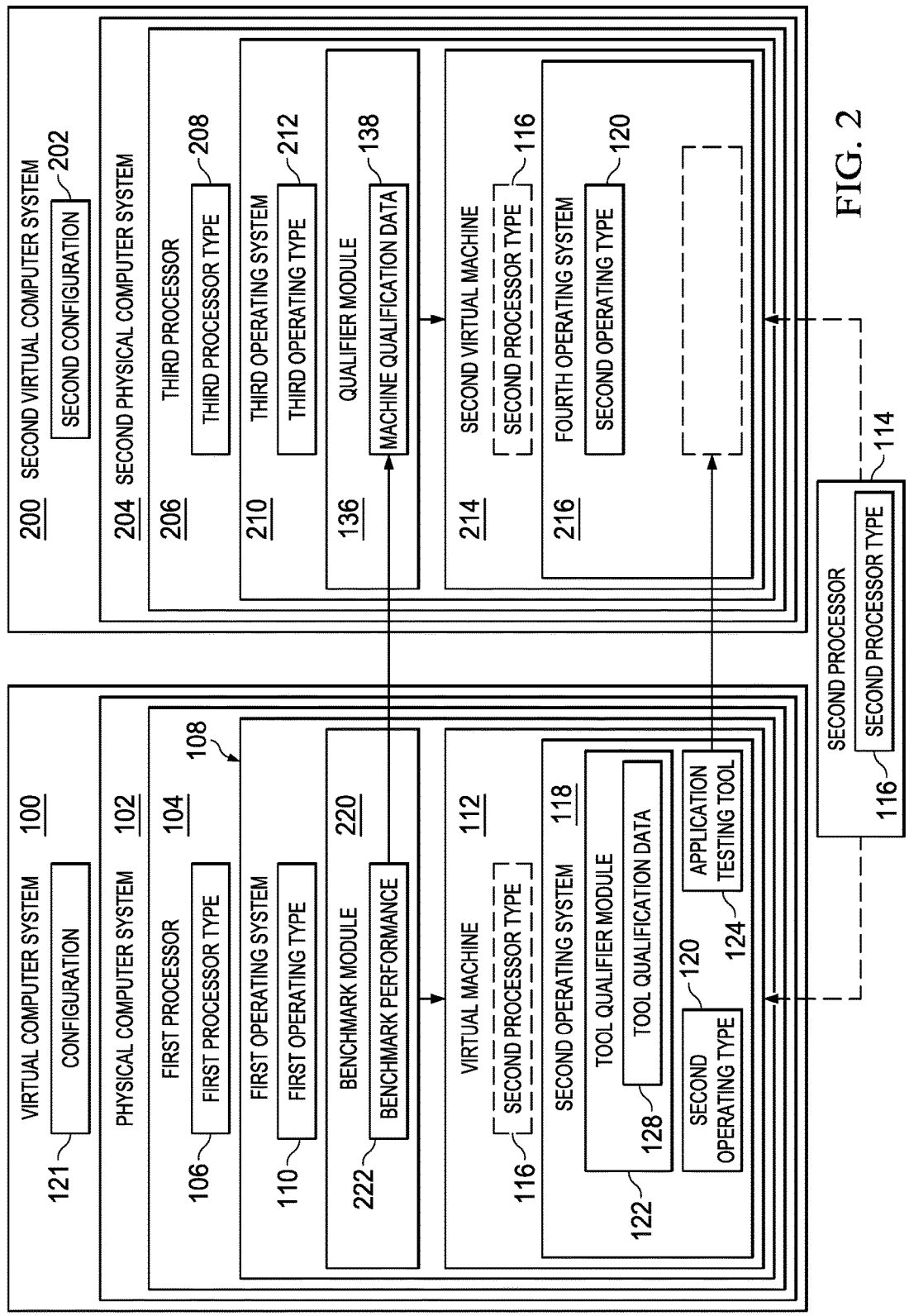
FIG. 2 is an illustration of a transfer of an application testing tool from a first virtual computer system to a second virtual computer system in the form of a block diagram in accordance with an illustrative embodiment.

With reference now to FIG. 2, an illustration of a transfer of an application testing tool from a first virtual computer system to a second virtual computer system is depicted in the form of a block diagram in accordance with an illustrative embodiment. In this illustrative example, application testing tool 124 from FIG. 1 may be transferred from a first virtual computer system having a first configuration to a different virtual computer system having a different configuration.

For example, the first virtual computer system having the first configuration may be virtual computer system 100 from FIG. 1 having configuration 121. In this illustrative example, virtual computer system 100 includes physical computer system 102 and virtual machine 112, which may also be referred to as a first physical computer system and a first virtual machine, respectively.

Application testing tool 124 may be verified using tool qualifier module 122 running on virtual computer system 100. Application testing tool 124 may then be transferred from virtual computer system 100 to second virtual computer system 200 having second configuration 202.

Second virtual computer system 200 includes second physical computer system 204. Second physical computer system 204 includes third processor 206 of third processor type 208. Third operating system 210 of third operating type 212 runs on third processor 206.

Second virtual computer system 200 also includes second virtual machine 214. Similar to virtual machine 112, second virtual machine 214 emulates second processor 114 of second processor type 116. In this illustrative example, fourth operating system 216 of second operating type 120 runs on second virtual machine 214. Fourth operating system 216 is the same type of operating system as second operating system 118. However, in other illustrative examples, fourth operating system 216 may be some other type of operating system with which application testing tool 124 is compatible.

Second configuration 202 of second virtual computer system 200 is defined by both a physical layer and a virtual layer. The physical layer is defined by third processor type 208 and third operating type 212. The virtual layer is defined by second processor type 116 and second operating type 120.

Prior to the transfer of application testing tool 124 from virtual computer system 100 to second virtual computer system 200, benchmark module 220 is used to establish benchmark performance 222 for virtual machine 112. Benchmark module 220 may be run on first processor 104 using first operating system 108 outside of virtual machine 112, while virtual machine 112 is run on first processor 104, to establish benchmark performance 222 for virtual machine 112.

Qualifier module 136 may be used to verify that second virtual machine 214 running on third processor 206 of second virtual computer system 200 meets benchmark performance 222 of virtual machine 112 within selected tolerances to thereby qualify second virtual machine 214. In other words, qualifier module 136 verifies that the performance of second virtual machine 214 is consistent with benchmark performance 222 of virtual machine 112. In other words, qualifier module 136 verifies equivalence between virtual machine 112 and second virtual machine 214. Depending on the implementation, machine qualification data 138 may also be used to perform this verification. In this manner, a qualified second virtual machine is formed.

Once application testing tool 124 has been qualified on virtual machine 112, transferring application testing tool 124 from virtual machine 112 to second virtual machine 214 does not require requalifying application testing tool 124 if second virtual machine 214 is already determined to be a qualified second virtual machine. Savings in time and effort are achieved by eliminating the need to repeat verification of application testing tool 124 on second virtual computer system 200.

Figure 3:
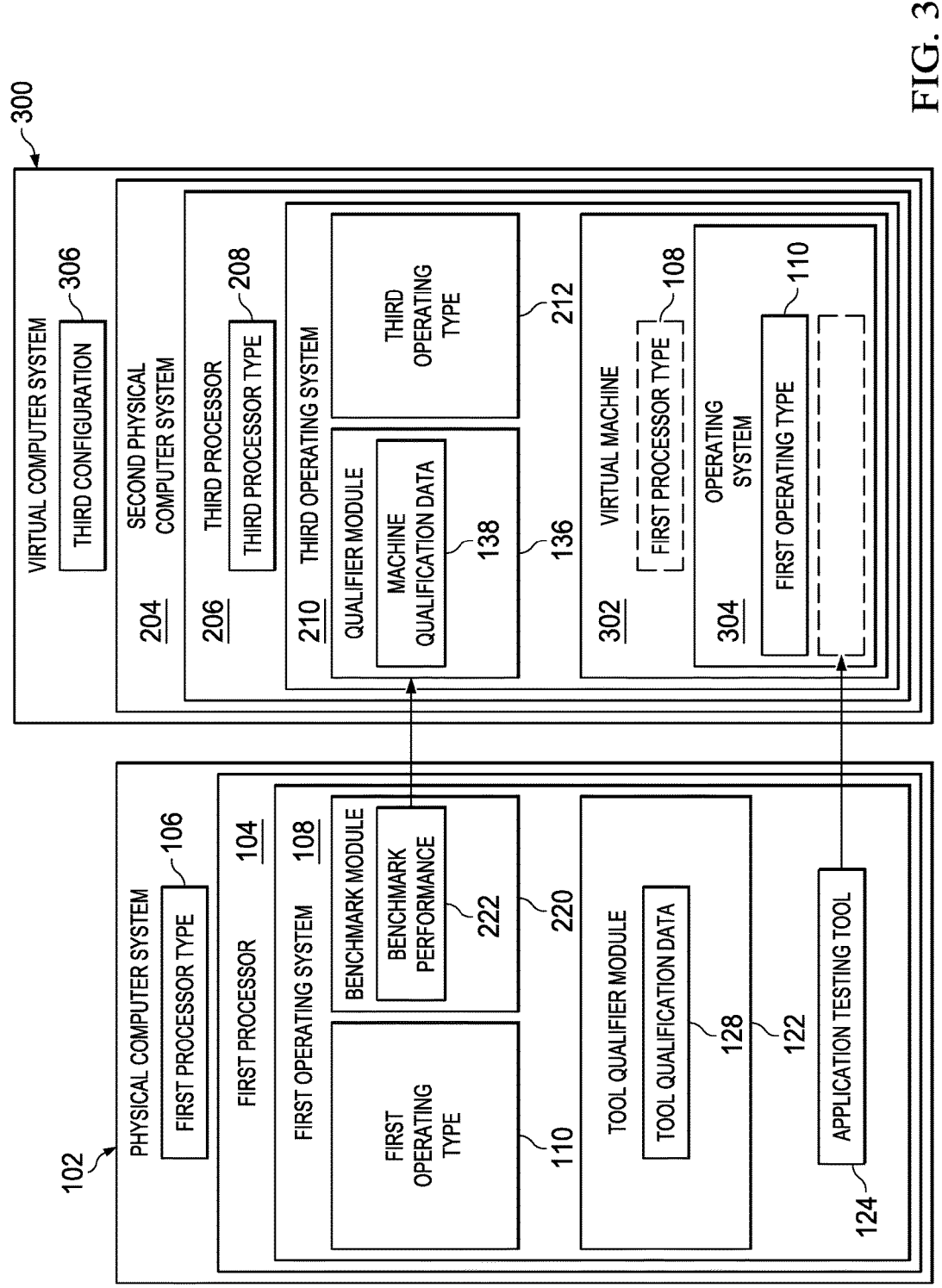
FIG. 3 is an illustration of a transfer of an application testing tool from a physical computer system to a virtual computer system in the form of a block diagram in accordance with an illustrative embodiment.

With reference now to FIG. 3, an illustration of a transfer of an application testing tool from a physical computer system to a virtual computer system is depicted in the form of a block diagram in accordance with an illustrative embodiment. In this illustrative example, application testing tool 124 from FIG. 1 may be transferred from physical computer system 102 from FIG. 1 to virtual computer system 300.

As depicted, physical computer system 102 includes first processor 104 of first processor type 106. First operating system 108 of first operating type 110 is run on first processor 104.

In this illustrative example, application testing tool 124 may be verified using tool qualifier module 122. For example, tool qualifier module 122 may use tool qualification data 128 to perform verification of application testing tool 124.

As depicted, virtual computer system 300 may include second physical computer system 204 from FIG. 2 having third processor 206 of third processor type 208. In this illustrative example, third operating system 210 of third operating type 212 is run on third processor 206 of third processor type 208. Further, virtual computer system 300 includes virtual machine 302 that is run on third processor 206. Virtual Machine 302 emulates first processor 104 of first processor type 106. Operating system 304 of first operating type 110 is run on virtual machine 302.

Virtual computer system 300 has third configuration 306. Third configuration 306 of virtual computer system 300 is defined by both a physical layer and a virtual layer. The physical layer is defined by third processor type 208 and third operating type 212. The virtual layer is defined by first processor type 106 and first operating type 110.

Before application testing tool 124 is transferred from physical computer system 102 to virtual computer system 300, benchmark module 220 is used to establish benchmark performance 222 for physical computer system 102. Qualifier module 136 then verifies virtual machine 302 using benchmark performance 222 to qualify the equivalence between physical computer system 102 and virtual machine 302. In this manner, qualifier module 136 verifies that the performance of virtual machine 302 is consistent with benchmark performance 222 for physical computer system 102. In some cases, qualifier module 136 may also use machine qualification data 138 to perform the verification of virtual machine 302.

Once virtual machine 302 has been qualified, or, in other words, determined to be a qualified virtual machine, application testing tool 124 may be transferred from physical computer system 102 to virtual machine 302. In particular, application testing tool 124 may then be run on virtual machine 302 without having to repeat the verification of application testing tool 124. Savings in time and effort are achieved by eliminating the need to repeat verification of application testing tool on virtual computer system 300.

The illustrations in FIGS. 1-3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, the various modules described in FIGS. 1-3 may be implemented using software, hardware, firmware, or a combination thereof. For example, without limitation, each of tool qualifier module 122, qualifier module 136, and benchmark module 220 may be implemented using software, hardware, firmware, or a combination thereof. When software is used, the operations performed by a module may be implemented using, for example, without limitation, program code configured to run on a processor unit. When firmware is used, the operations performed by the module may be implemented using, for example, without limitation, program code and data and stored in persistent memory to run on a processor unit.

When hardware is employed, the hardware may include one or more circuits that operate to perform the operations performed by the module. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

A computer program may comprise at least one of a compiler, an interpreter, a main program, a sub-program, a script, or some other software part. In this manner, a virtual machine, such as virtual machine 112, an application testing tool, such as application testing tool 124, and an application program, such as application program 126, may each comprise at least one of a compiler, an interpreter, a main program, a sub-program, a script, or some other software part.

Further, depending on the implementation, a hardware configuration or a hardware software configuration may include at least a processor and an operating system. In some cases, a hardware configuration or a hardware software configuration may include additional components such as, for example, without limitation, at least one of memory, an input/output device, or some other type of component.

In alternative illustrative examples, second physical computer system 204 in FIG. 3 may have a different configuration that includes second processor 114 of second processor type 116 from FIG. 1 with second operating system 118 of second operating type 120 from FIG. 1 running on second processor 114. Thus, in these alternative examples, virtual machine 302 may be run on second processor 114 using second operating system 118. Further, in these alternative examples, third operating system 210 of third operating type 212 may be configured to run on virtual machine 302.

Figure 4:
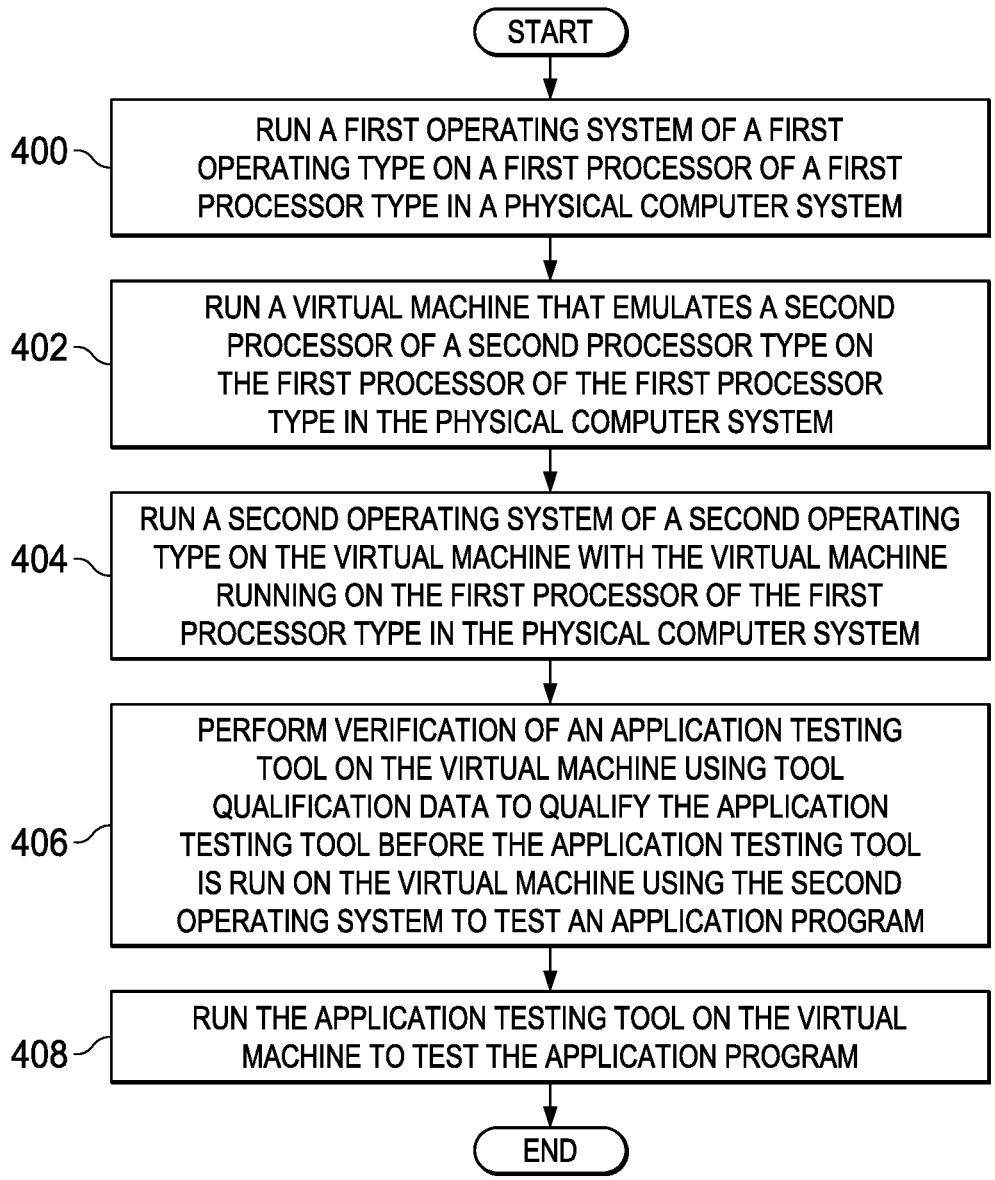
FIG. 4 is an illustration of a process for testing application software for installation on a hardware platform using a virtual computer system in the form of a flowchart in accordance with an illustrative embodiment.

With reference now to FIG. 4, an illustration of a process for testing application software for installation on a hardware platform using a virtual computer system is depicted in the form of a flowchart in accordance with an illustrative embodiment. The process illustrated in FIG. 4 may be implemented for virtual computer system 100 in FIG. 1.

The process may begin by running a first operating system of a first operating type on a first processor of a first processor type in a physical computer system (operation 400). In operation 400, the physical computer system may be, for example, physical computer system 102 in FIG. 1 having first processor 104 of first processor type 106 in FIG. 1.

Next, a virtual machine that emulates a second processor of a second processor type is run on the first processor of the first processor type in the physical computer system (operation 402). In operation 402, the virtual machine may be virtual machine 112 in FIG. 1. A second operating system of a second operating type is run on the virtual machine with the virtual machine running on the first processor of the first processor type in the physical computer system (operation 404).

In one illustrative example, the virtual machine described in operations 402 and 404 may already be qualified on the first processor. In other words, verification that the virtual machine operates in a manner that meets all expected requirements may have already been performed. More specifically, verification that the virtual machine emulates the second processor of the second processor type according to requirements when run on the first processor using the first operating system may have already been performed.

Thereafter, a verification of an application testing tool is performed on the virtual machine using tool qualification data to qualify the application testing tool before the application testing tool is run on the virtual machine using the second operating system to test an application program (operation 406). Verification of the application testing tool through the virtual machine is performed independently of the first processor of the first processor type. In other words, the application testing tool is verified with respect to the virtual machine independently of the processor on which the virtual machine is run.

The application testing tool is then run on the virtual machine to test the application program (operation 408), with the process terminating thereafter. In operation 408, the application testing tool may be used to test the application program prior to the application program being installed on a hardware platform, such as a vehicle hardware platform.

In one illustrative example, the application testing tool is incapable of functioning using the first operating system of the first operating type. Additionally, the second operating type of the second operating system is incompatible with the first processor type of the first processor. Running the virtual machine that emulates the second processor of the second processor type on the first processor of the first processor type enables execution of the application testing tool through the second operating system of the second operating type running on the virtual machine despite these incompatibilities.

Figure 5:
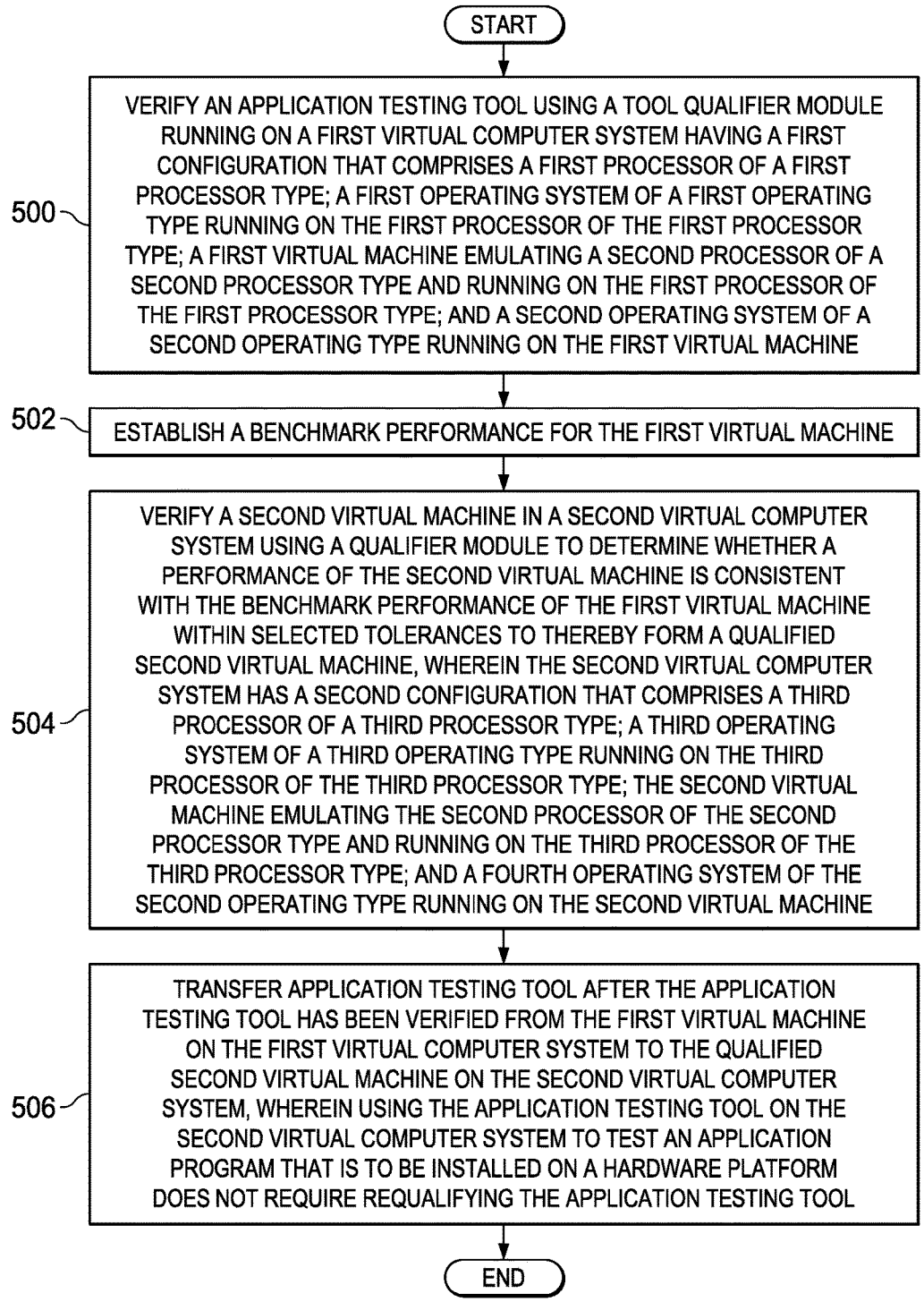
FIG. 5 is an illustration of a process for testing application software for installation on a hardware platform using a virtual computer system in the form of a flowchart in accordance with an illustrative embodiment.

With reference now to FIG. 5, an illustration of a process for testing application software for installation on a hardware platform using a virtual computer system is depicted in the form of a flowchart in accordance with an illustrative embodiment. The process illustrated in FIG. 5 may be implemented using virtual computer system 100 in FIG. 2 and second virtual computer system 200 in FIG. 2.

The process may begin by verifying an application testing tool using a tool qualifier module running on a first virtual computer system having a first configuration that comprises a first processor of a first processor type; a first operating system of a first operating type running on the first processor of the first processor type; a first virtual machine emulating a second processor of a second processor type and running on the first processor of the first processor type; and a second operating system of a second operating type running on the first virtual machine (operation 500). In operation 500, this first virtual computer system may be virtual computer system 100 described in FIG. 2.

Next, a benchmark performance is established for the first virtual machine (operation 502). Operation 502 may be performed using, for example, benchmark module 220 in FIG. 2.

Thereafter, a second virtual machine in a second virtual computer system is verified using a qualifier module to determine whether a performance of the second virtual machine is consistent with the benchmark performance of the first virtual machine within selected tolerances to thereby form a qualified second virtual machine, wherein the second virtual computer system has a second configuration that comprises a third processor of a third processor type; a third operating system of a third operating type running on the third processor of the third processor type; the second virtual machine emulating the second processor of the second processor type and running on the third processor of the third processor type; and a fourth operating system of the second operating type running on the second virtual machine (operation 504). The verification performed in operation 504 may be performed using qualifier module 136 in FIG. 2.

In operation 504, the second virtual computer system may be, for example, without limitation, second virtual computer system 200 in FIG. 2. In some cases, the selected tolerances in operation 504 may be such that verification of the second virtual machine requires that the second virtual machine running on the third processor behave exactly as the first virtual machine that runs on the first processor.

After the application testing tool has been verified, the application testing tool is transferred from the first virtual machine on the first virtual computer system to the qualified second virtual machine on the second virtual computer system, wherein using the application testing tool on the second virtual computer system to test an application program that is to be installed on a hardware platform does not require requalifying the application testing tool (operation 506), with the process terminating thereafter.

Figure 6:
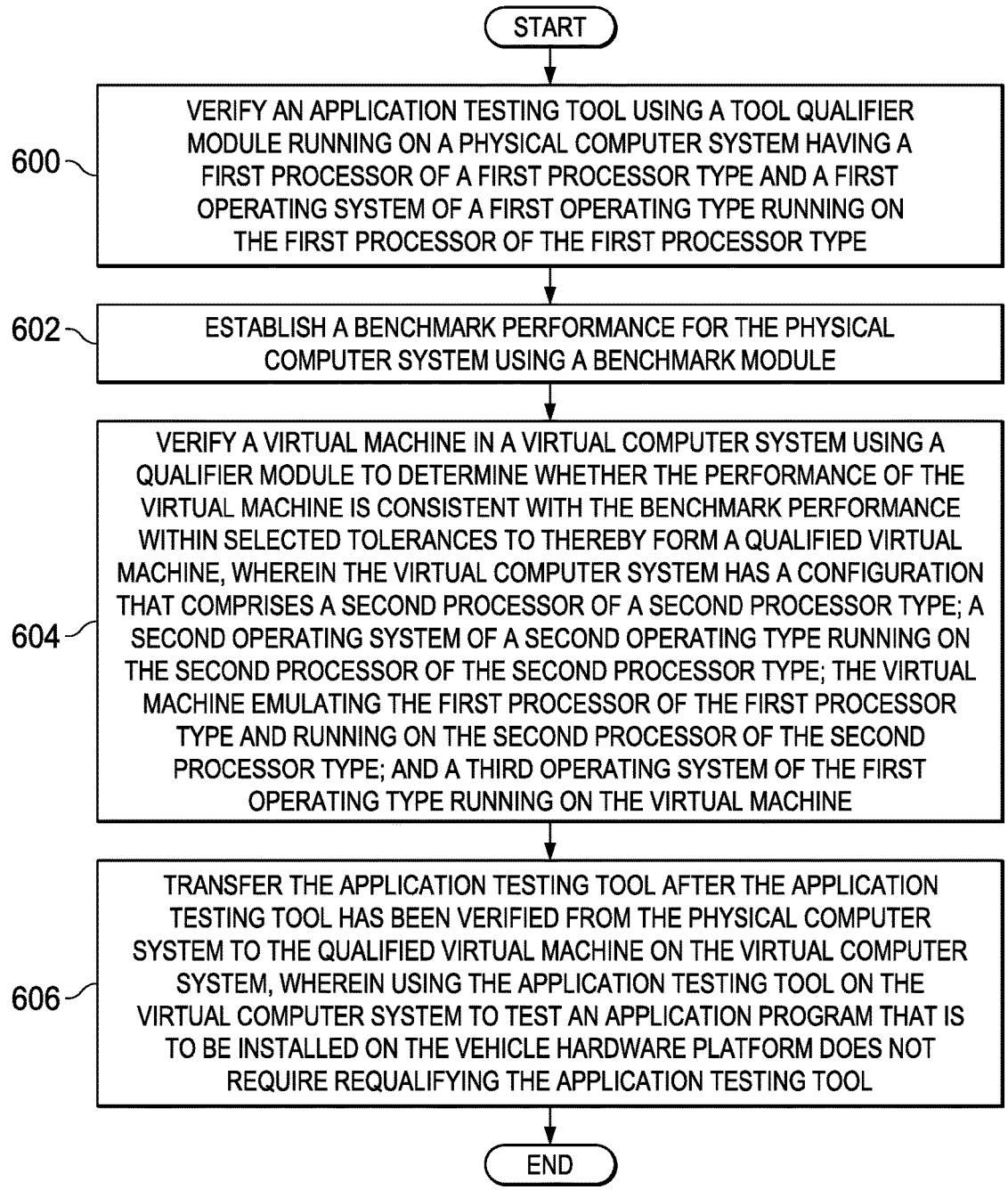
FIG. 6 is an illustration of a process for testing application software for installation on a hardware platform using a virtual computer system in the form of a flowchart in accordance with an illustrative embodiment.

With reference now to FIG. 6, an illustration of a process for testing application software for installation on a hardware platform using a virtual computer system is depicted in the form of a flowchart in accordance with an illustrative embodiment. The process illustrated in FIG. 6 may be implemented using physical computer system 102 in FIG. 1 and virtual computer system 300 in FIG. 3.

The process begins by verifying an application testing tool using a tool qualifier module running on a physical computer system having a first processor of a first processor type and a first operating system of a first operating type running on the first processor of the first processor type (operation 600). In operation 600, the tool qualifier module may be tool qualifier module 122 in FIG. 3.

Next, a benchmark performance is established for the physical processor system using a benchmark module (operation 602). In operation 602, the benchmark module may be, for example, benchmark module 220 in FIG. 3.

Thereafter, a virtual machine in a virtual computer system is verified using a qualifier module to determine whether the performance of the virtual machine is consistent with the benchmark performance within selected tolerances to thereby form a qualified virtual machine, wherein the virtual computer system has a configuration that comprises a second processor of a second processor type; a second operating system of a second operating type running on the second processor of the second processor type; the virtual machine emulating the first processor of the first processor type and running on the second processor of the second processor type; and a third operating system of the first operating type running on the virtual machine (operation 604). In operation 604, the qualifier module may be qualifier module 136 in FIG. 3.

Next, after the application testing tool has been verified, the application testing tool is transferred from the physical computer system to the qualified virtual machine on the virtual computer system, wherein using the application testing tool on the virtual computer system to test an application program that is to be installed on the vehicle hardware platform does not require requalifying the application testing tool (operation 606), with the process terminating thereafter.

Figure 7:
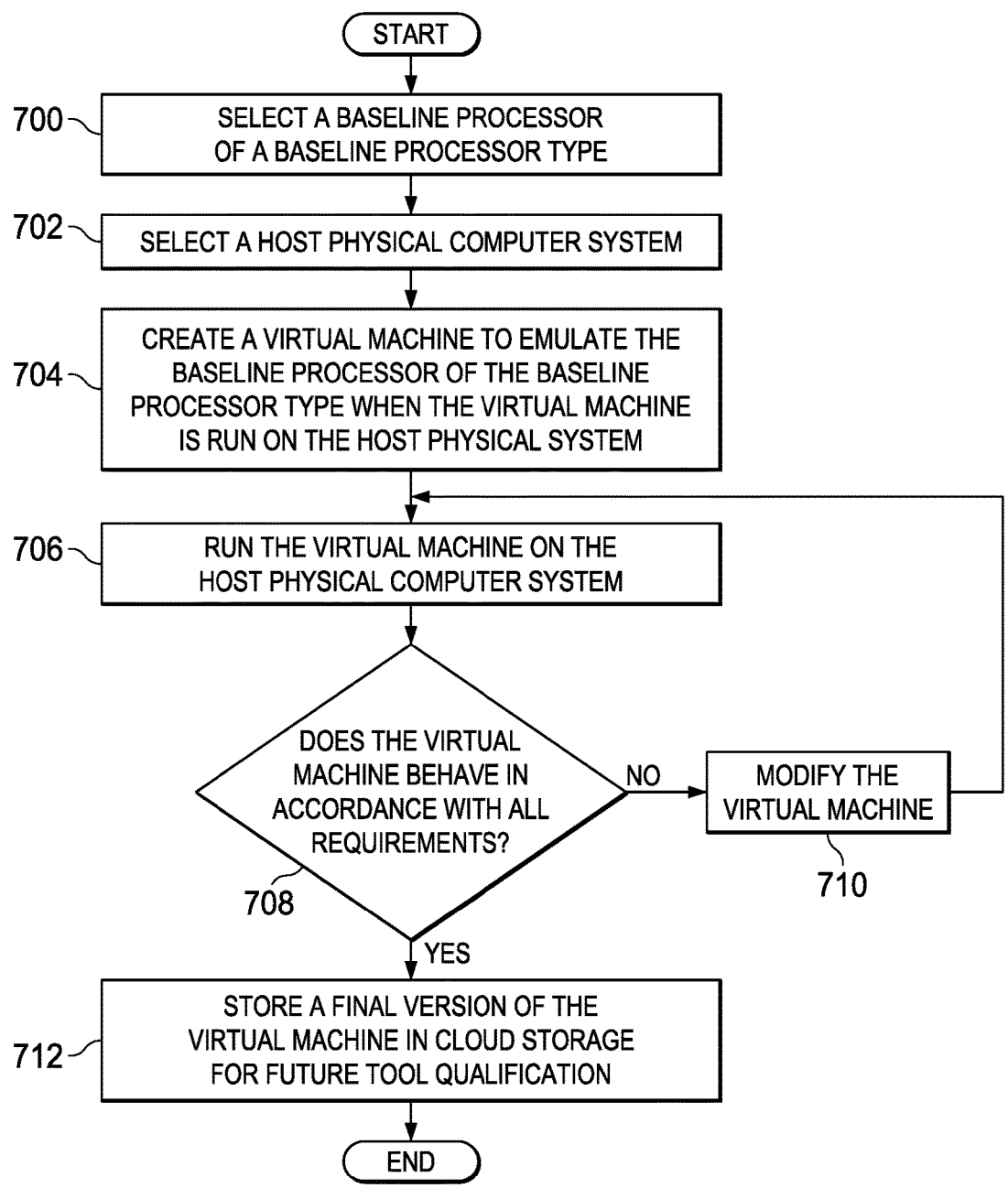
FIG. 7 is an illustration of a process for creating a tool qualification virtual machine in the form of a flowchart in accordance with an illustrative embodiment.

With reference now to FIG. 7, an illustration of a process for creating a tool qualification virtual machine is depicted in the form of a flowchart in accordance with an illustrative embodiment. The process illustrated in FIG. 7 may be used to create, for example, virtual machine 112 described in FIGS. 1-2, virtual machine 302 in FIG. 3 or both.

The process may begin by selecting a baseline processor of a baseline processor type (operation 700). In one illustrative example, in operation 700, the baseline processor type may be the same processor type used in a vehicle hardware platform that is used onboard a vehicle or some other type of complex system. In other cases, the baseline processor type may be selected based on some other type of baseline hardware configuration or baseline hardware and software configuration.

Thereafter, a host physical computer system is selected (operation 702). Next, a virtual machine is created to emulate the baseline processor of the baseline processor type when the virtual machine is run on the host physical computer system (operation 704). In particular, the virtual machine may be created to be compatible with the hardware and software configuration of the host physical computer but to emulate the baseline processor of the baseline processor type.

Further, in operation 704, the virtual machine is created such that the virtual machine can host a desired set of software tools that are to be used for certifying software. For example, the virtual machine is created such that the virtual machine can host a variety of application testing tools for testing application programs to determine whether these application programs are certifiable.

Thereafter, the virtual machine is run on the host physical computer system (operation 706). A determination is made as to whether the virtual machine behaves in accordance with all requirements (operation 708). If the virtual machine does not behave in accordance with all requirements, the virtual machine is modified (operation 710), with the process then returning to operation 706 described above. Operation 706 is performed by running the modified virtual machine on the selected host physical computer system.

With reference again to operation 708, if the virtual machine does behave in accordance with all requirements, a final version of the virtual machine is stored in cloud storage for future tool qualification (operation 712), with the process terminating thereafter. This final version of the virtual machine may be referred to as a tool qualification virtual machine.

Figure 8:
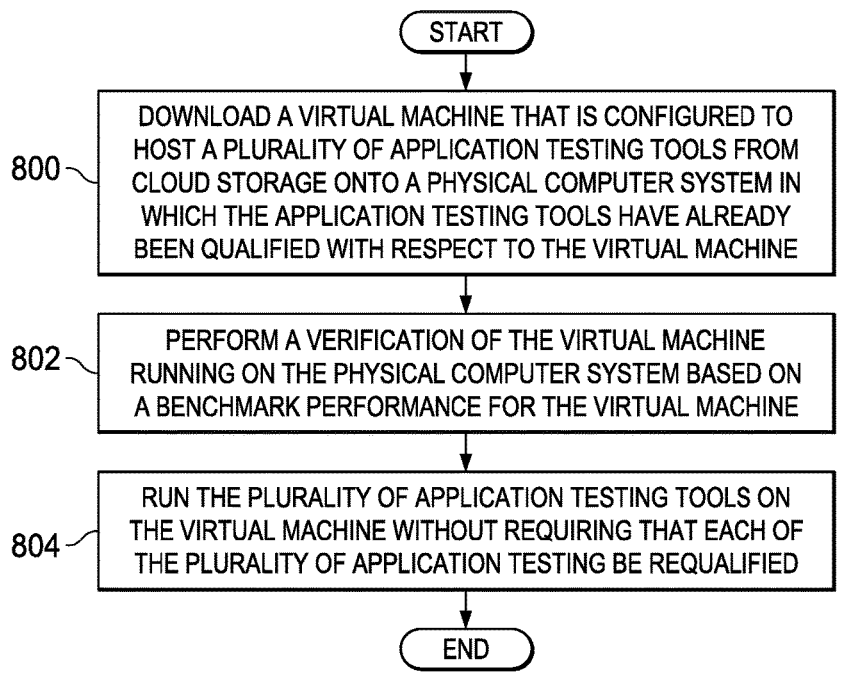
FIG. 8 is an illustration of a process for qualifying a plurality of software tools in the form of a flowchart in accordance with an illustrative embodiment.

With reference now to FIG. 8, an illustration of a process for qualifying a plurality of software tools is depicted in accordance with an illustrative embodiment. The process illustrated in FIG. 8 may be performed using a virtual machine, such as a virtual machine 112 described in FIGS. 1-2, virtual machine 302, or both.

The process begins by downloading a virtual machine that is configured to host a plurality of application testing tools from cloud storage onto a physical computer system in which the application testing tools have already been qualified with respect to the virtual machine (operation 800). Next, a verification of the virtual machine running on the physical computer system is performed based on a benchmark performance for the virtual machine (operation 802). The plurality of application testing tools are then run on the virtual machine without requiring that each of the plurality of application testing be requalified (operation 804), with the process terminating thereafter.

Figure 9:
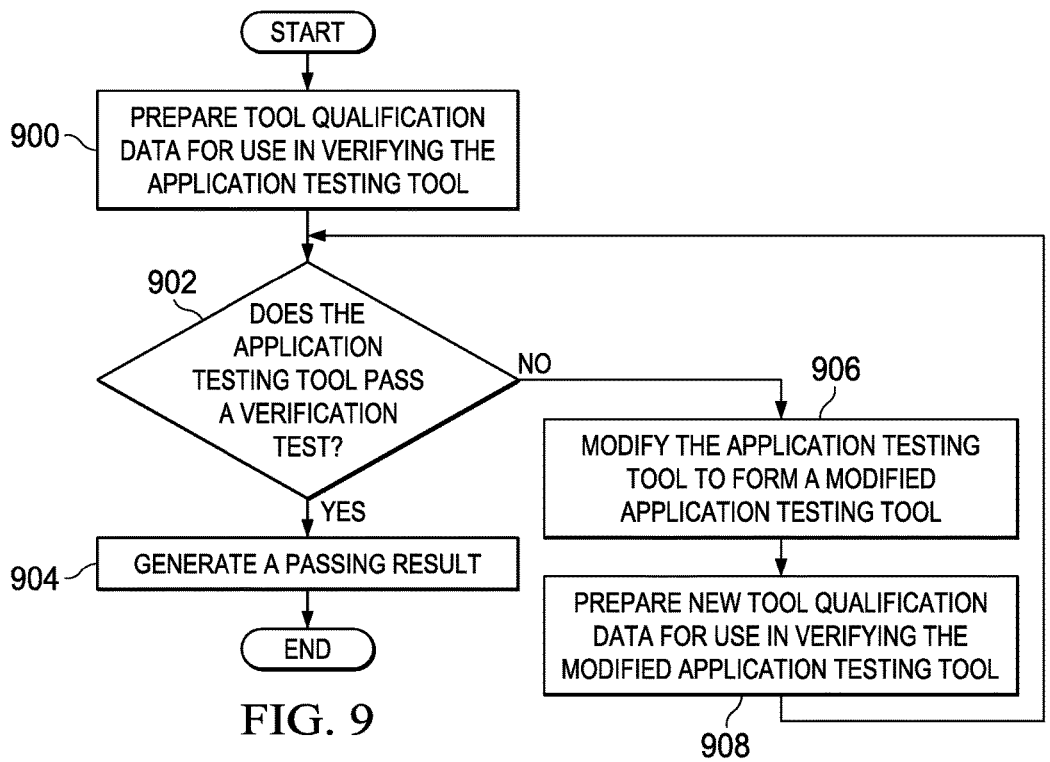
FIG. 9 is an illustration of a process for verifying an application testing tool in the form of a flowchart in accordance with an illustrative embodiment.

With reference now to FIG. 9, an illustration of a process for verifying an application testing tool is depicted in the form of a flowchart in accordance with an illustrative embodiment. The process illustrated in FIG. 9 may be used to implement operation 406 in FIG. 4. In particular, this process may be used to verify, for example, application testing tool 124 in FIG. 1. Further, this process may be implemented using virtual computer system 100 in FIG. 1.

The process begins by preparing tool qualification data for use in verifying the application testing tool (operation 900). In operation 900, the tool qualification data may include at least one of tool source data, regression test input data, regression test output data, or some other type of input data.

Next, a determination is made as to whether the application testing tool passes a verification test using tool qualification data (operation 902). If the application testing tool passes the verification test, a passing result is generated (operation 904), with the process terminating thereafter.

In some cases, operation 900 may also include validating the application testing tool. Thus, in these cases, operation 902 may include determining whether the application testing tool passes both the verification test and a validation test.

Otherwise, the application testing tool is modified to form a modified application testing tool (operation 906). Thereafter, new tool qualification data is prepared for use in verifying the modified application testing tool (operation 908). In operation 908, preparing the new tool qualification data may include, for example, replacing the tool source data with new tool source data based on the modified application testing tool. In other illustrative examples, preparing the new tool qualification data may also include generating at least one of new regression test input data, new regression test output data, or some other type of new data for testing. The process then returns to operation 902 described above to determine whether the modified application testing tool passes the verification test using the new tool qualification data.

Figure 10:
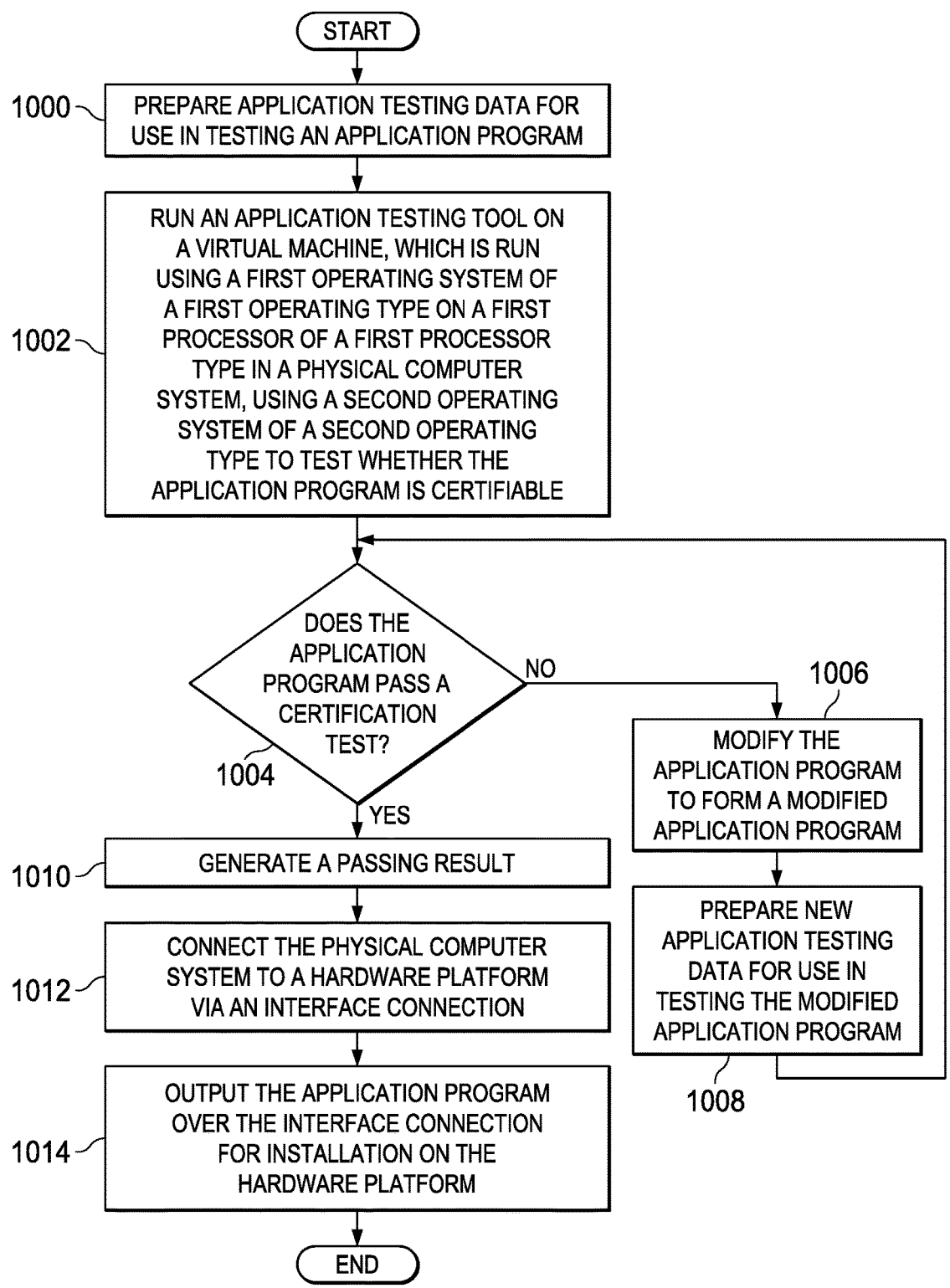
FIG. 10 is an illustration of a process for preparing application software for installation on a hardware platform in the form of a flowchart in accordance with an illustrative embodiment.

With reference now to FIG. 10, an illustration of a process for preparing application software for installation on a hardware platform in the form of a flowchart is depicted in accordance with an illustrative embodiment. The process illustrated in FIG. 10 may be implemented to test and install application program 126 in a hardware platform, such as vehicle hardware platform 132 in FIG. 1.

The process may begin by preparing application testing data for use in testing an application program (operation 1000). In operation 1000, the application testing data may include at least one of application source data, regression test input data, regression test output data, or some other type of input data.

An application testing tool is run on a virtual machine in which the virtual machine is run using a first operating system of a first operating type on a first processor of a first processor type in a physical computer system, using a second operating system of a second operating type to test whether the application program is certifiable (operation 1002). In this manner, in operation 1002, the application testing tool tests the application program. A determination is made as to whether the application program passes a certification test using the application testing data (operation 1004).

If the application program does not pass the certification test, the application program is modified to form a modified application program (operation 1006). Thereafter, new application testing data is prepared for use in testing the modified application program (operation 1008). The process then returns to operation 1004 described above to determine whether the modified application program passes the certification test.

In operation 1008, preparing the new application testing data may include, for example, replacing the application source data prepared in operation 1000 with new application source data based on the modified application program. In other illustrative examples, preparing the new application testing data may also include generating at least one of new regression test input data, new regression test output data, or some other type of new data for testing.

With reference again to operation 1004, if the application program passes the certification test, a passing result is generated (operation 1010). Next, the physical computer system is connected to a hardware platform via an interface connection (operation 1012). The virtual machine provides connectivity to the physical interface connection for the second operating system running on the second processor emulated in the virtual machine. The application program is then output over the interface connection for installation on the hardware platform (operation 1014), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in other illustrative examples, the process described in FIG. 5 may include creating the first virtual machine at some point prior to operation 500 and creating the second virtual machine at some point prior to operation 504. For example, the first virtual machine may be created such that the virtual machine emulates the second processor of the second processor type when the first virtual machine is run on any processor of the first processor type. Further, the second virtual machine may be created such that the second virtual machine emulates the second processor of the second processor type when the second virtual machine is run on any processor of the third processor type.

Figure 11:
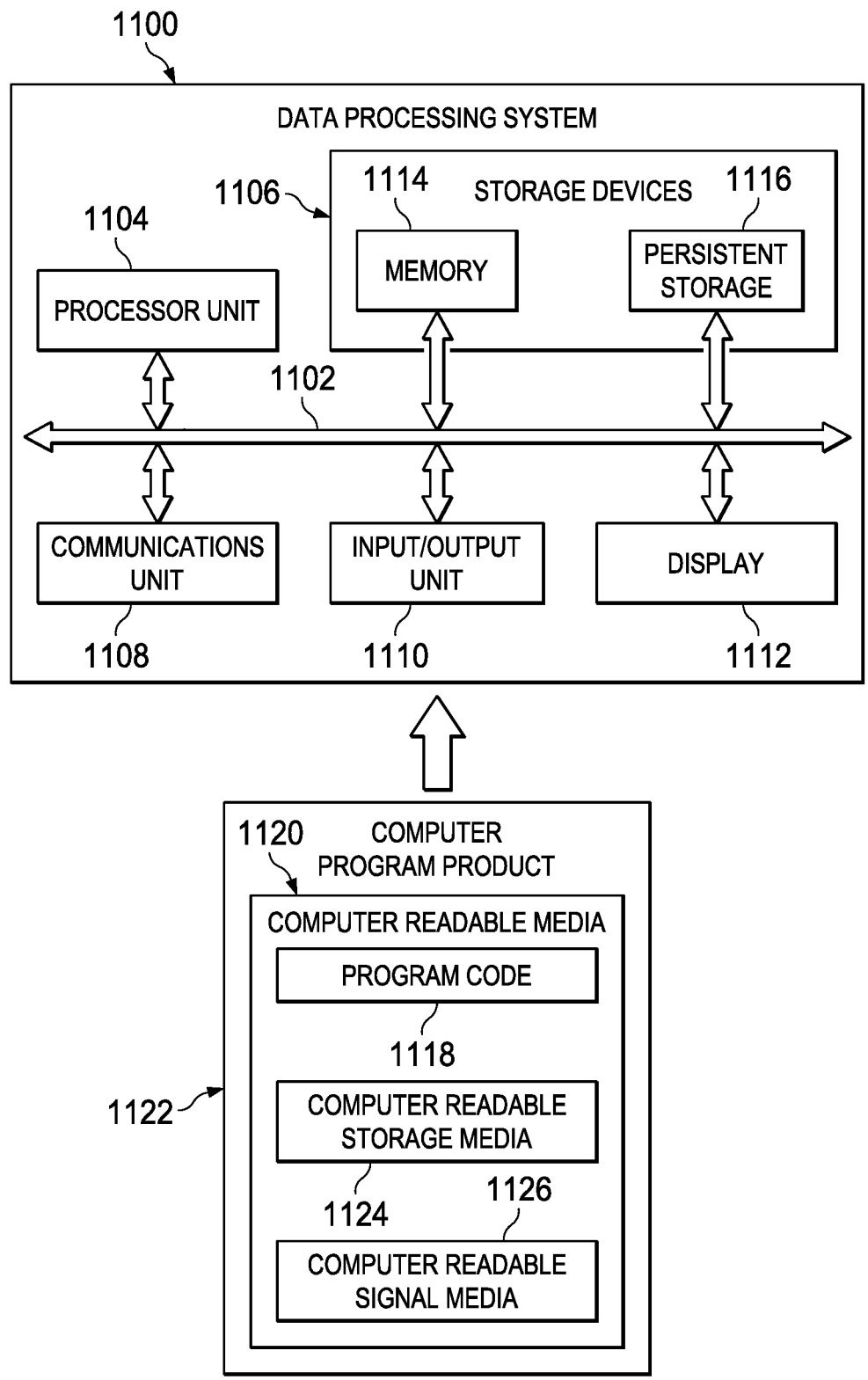
FIG. 11 is an illustration of a data processing system in the form of a block diagram in accordance with an illustrative embodiment.

Turning now to FIG. 11, an illustration of a data processing system in the form of a block diagram is depicted in accordance with an illustrative embodiment. Data processing system 1100 may be used to implement physical computer system 102 in FIG. 1, second physical computer system 204 in FIG. 2, or both. As depicted, data processing system 1100 includes communications framework 1102, which provides communications between processor unit 1104, storage devices 1106, communications unit 1108, input/output unit 1110, and display 1112. In some cases, communications framework 1102 may be implemented as a bus system.

Processor unit 1104 is configured to execute instructions for software to perform a number of operations. Processor unit 1104 may comprise a number of processors, a multi-processor core, and/or some other type of processor, depending on the implementation. In some cases, processor unit 1104 may take the form of a hardware unit, such as a circuit system, an application specific integrated circuit (ASIC), a programmable logic device, or some other suitable type of hardware unit.

Instructions for the operating system, applications, and/or programs run by processor unit 1104 may be located in storage devices 1106. Storage devices 1106 may be in communication with processor unit 1104 through communications framework 1102. As used herein, a storage device, also referred to as a computer readable storage device, is any piece of hardware capable of storing information on a temporary and/or permanent basis. This information may include, but is not limited to, data, program code, and/or other information.

Memory 1114 and persistent storage 1116 are examples of storage devices 1106. Memory 1114 may take the form of, for example, a random access memory or some type of volatile or non-volatile storage device. Persistent storage 1116 may comprise any number of components or devices. For example, persistent storage 1116 may comprise a hard drive, a flash memory, a rewritable optical disk, a rewritable magnetic tape, or some combination of the above. The media used by persistent storage 1116 may or may not be removable.

Communications unit 1108 allows data processing system 1100 to communicate with other data processing systems and/or devices. Communications unit 1108 may provide communications using physical and/or wireless communications links.

Input/output unit 1110 allows input to be received from and output to be sent to other devices connected to data processing system 1100. For example, input/output unit 1110 may allow user input to be received through a keyboard, a mouse, and/or some other type of input device. As another example, input/output unit 1110 may allow output to be sent to a printer connected to data processing system 1100.

Display 1112 is configured to display information to a user. Display 1112 may comprise, for example, without limitation, a monitor, a touch screen, a laser display, a holographic display, a virtual display device, and/or some other type of display device.

In this illustrative example, the processes of the different illustrative embodiments may be performed by processor unit 1104 using computer-implemented instructions. These instructions may be referred to as program code, computer usable program code, or computer readable program code and may be read and executed by one or more processors in processor unit 1104.

In these examples, program code 1118 is located in a functional form on computer readable media 1120, which is selectively removable, and may be loaded onto or transferred to data processing system 1100 for execution by processor unit 1104. Program code 1118 and computer readable media 1120 together form computer program product 1122. In this illustrative example, computer readable media 1120 may be computer readable storage media 1124 or computer readable signal media 1126.

Computer readable storage media 1124 is a physical or tangible storage device used to store program code 1118 rather than a medium that propagates or transmits program code 1118. Computer readable storage media 1124 may be, for example, without limitation, an optical or magnetic disk or a persistent storage device that is connected to data processing system 1100.

Alternatively, program code 1118 may be transferred to data processing system 1100 using computer readable signal media 1126. Computer readable signal media 1126 may be, for example, a propagated data signal containing program code 1118. This data signal may be an electromagnetic signal, an optical signal, and/or some other type of signal that can be transmitted over physical and/or wireless communications links.

The illustration of data processing system 1100 in FIG. 11 is not meant to provide architectural limitations to the manner in which the illustrative embodiments may be implemented. The different illustrative embodiments may be implemented in a data processing system that includes components in addition to or in place of those illustrated for data processing system 1100. Further, components shown in FIG. 11 may be varied from the illustrative examples shown.

Figure 12:
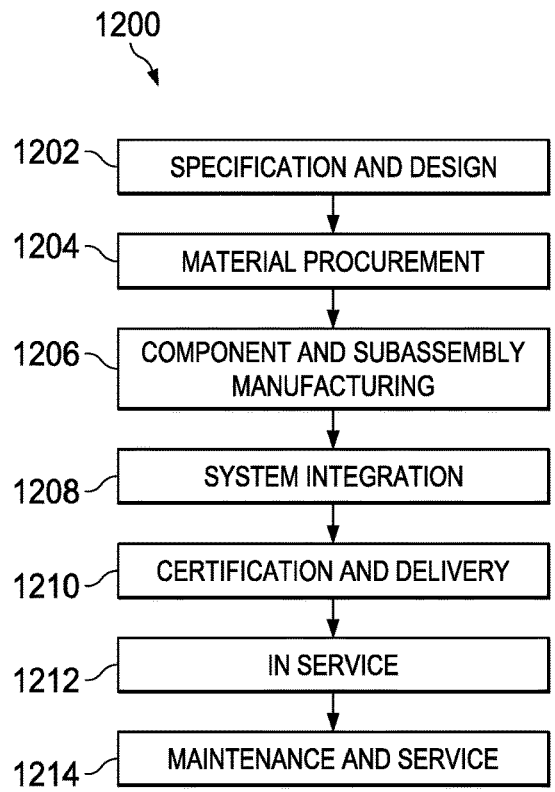
FIG. 12 is an illustration of an aircraft manufacturing and service method in the form of a block diagram in accordance with an illustrative embodiment.
Figure 13:
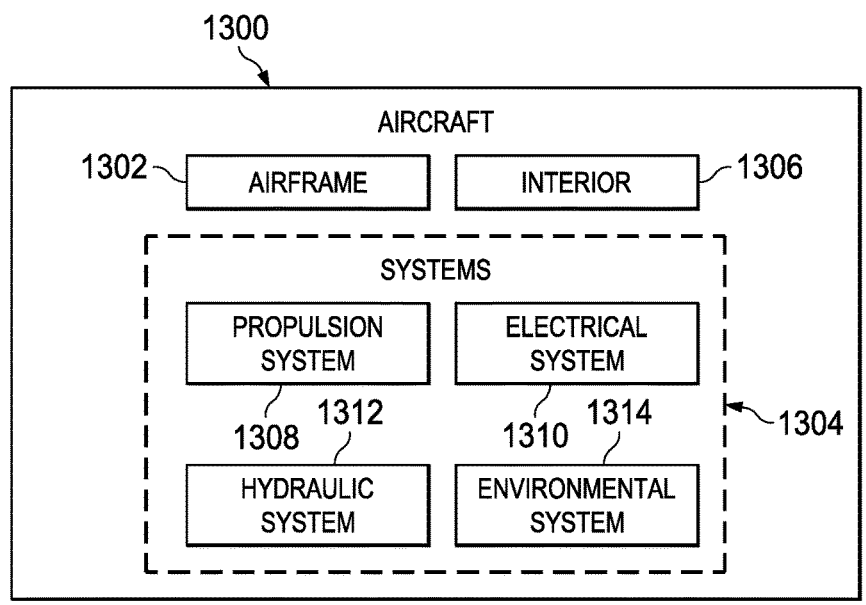
FIG. 13 is an illustration of an aircraft in the form of a block diagram in accordance with an illustrative embodiment.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method in the form of a block diagram is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft in the form of a block diagram is depicted in which an illustrative embodiment may be implemented. In this example, aircraft 1300 is produced by aircraft manufacturing and service method 1200 in FIG. 12 and may include airframe 1302 with systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12. In particular, virtual computer system 100 from FIG. 1 may be used to develop and test application software during any one of the stages of aircraft manufacturing and service method 1200. For example, without limitation, virtual computer system 100 from FIG. 1 may be used to develop and test application software for installation on a hardware platform onboard aircraft 1300 during at least one of component and subassembly manufacturing 1206, system integration 1208, routine maintenance and service 1214, or some other stage of aircraft manufacturing and service method 1200.

In one illustrative example, components or subassemblies produced in component and subassembly manufacturing 1206 in FIG. 12 may be fabricated or manufactured in a manner similar to components or subassemblies produced while aircraft 1300 is in service 1212 in FIG. 12. As yet another example, one or more apparatus embodiments, method embodiments, or a combination thereof may be utilized during production stages, such as component and subassembly manufacturing 1206 and system integration 1208 in FIG. 12. One or more apparatus embodiments, method embodiments, or a combination thereof may be utilized while aircraft 1300 is in service 1212 and/or during maintenance and service 1214 in FIG. 12. The use of a number of the different illustrative embodiments may substantially expedite the assembly of and/or reduce the cost of aircraft 1300.

Thus, the illustrative embodiments provide a method and apparatus for qualifying application testing tools using virtual machines, such as virtual machine 112 in FIG. 1. For example, verifying application testing tool 124 in FIG. 1 using tool qualifier module 122 that is run on virtual machine 112 in FIG. 1 avoids the need to requalify application testing tool 124 at a later point in time when virtual machine 112 is run on a different hardware configuration. One virtual machine, such as virtual machine 112 in FIG. 1, which has been qualified to run on a physical computer system, may be used to run multiple application testing tools that have been previously qualified with respect to the virtual machine without having to individually re-verify each application testing tool.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a physical computer system comprising:
   a first processor of a first processor type; and
   a first operating system of a first operating type running on the first processor of the first processor type;
   a tool qualifier module that is run on the physical computer system to verify an application testing tool using tool qualification data to qualify the application testing tool;
   a benchmark module that establishes a benchmark performance for the physical computer system;
   a virtual computer system having a configuration comprising:
   a second processor of a second processor type;
   a second operating system of a second operating type running on the second processor of the second operating type;
   a virtual machine emulating the first processor of the first processor type and running on the second processor of the second processor type; and
   a third operating system of the first operating type running on the virtual machine; and
   a qualifier module for verifying the virtual machine to determine whether the performance of the virtual machine is consistent with the benchmark performance of the physical computer system within selected tolerances to thereby form a qualified virtual machine such that transferring the application testing tool after the application testing tool has been qualified from the physical computer system to the qualified virtual machine on the virtual computer system does not require requalifying the application testing tool.

2. The apparatus of claim 1 further comprising:
   the application testing tool, wherein the application testing tool is run on the virtual machine using the third operating system to determine whether an application program is certifiable.

3. The apparatus of claim 2, wherein the virtual computer system comprises:
   an interface connection to a hardware platform, wherein the application program is output over the interface connection for installation on the hardware platform in response to a determination that the application program is certifiable.

4. The apparatus of claim 3, wherein the hardware platform is selected from one of an aircraft hardware platform, a spacecraft hardware platform, a watercraft hardware platform, or a ground vehicle hardware platform.

5. The apparatus of claim 2, wherein the application testing tool uses application data that includes at least one of application source code, regression test input data, and regression test output data to test the application program for use on a hardware platform.

6. The apparatus of claim 1, wherein the tool qualification data includes at least one of tool source data, regression test input data, and regression test output data.

7. The apparatus of claim 1, wherein the first processor type is different from the second processor type and the first operating type is different from the second operating type.

8. A method for testing application software for installation on a hardware platform using virtual computer systems, the method comprising:
   verifying an application testing tool using a tool qualifier module running on a physical computer system having a first processor of a first processor type and a first operating system of a first operating type running on the first processor of the first processor type to qualify the application testing tool;
   establishing a benchmark performance for the physical computer system;
   verifying a virtual machine in a virtual computer system using a qualifier module to determine whether a performance of the virtual machine is consistent with the benchmark performance of the physical computer system within selected tolerances to thereby form a qualified virtual machine, wherein the virtual computer system has a configuration that comprises:
- a second processor of a second processor type;
- a second operating system of a second operating type running on the second processor of the second processor type;
- the virtual machine emulating the first processor of the first processor type and running on the second processor of the second processor type; and
- a third operating system of the first operating type running on the virtual machine; and transferring the application testing tool, after the application testing tool has been qualified, from the physical computer system to the qualified virtual machine on the virtual computer system, wherein using the application testing tool on the virtual computer system to test an application program that is to be installed on the hardware platform does not require requalifying the application testing tool.

9. The method of claim 8 further comprising:
running the application testing tool on the virtual machine emulating the first processor of the first processor type using the third operating system of the first operating type to test whether the application program is certifiable.

10. The method of claim 9 further comprising:
connecting the virtual computer system to the hardware platform via an interface connection; and
outputting the application program over the interface connection for installation on the hardware platform in response to a determination that the application program is certifiable.

11. The method of claim 10 further comprising:
installing the application program on the hardware platform, wherein the hardware platform is a vehicle hardware platform that is selected from one of an aircraft hardware platform, a spacecraft hardware platform, a watercraft hardware platform, or a ground vehicle hardware platform.

12. The method of claim 8, wherein verifying the application testing tool comprises: verifying the application testing tool using the tool qualifier module and too qualification data includes at least one of tool source data, regression test input data, or regression test output data.

13. The method of claim 8 further comprising:
transferring the application testing tool, after the application testing tool has been qualified, from the qualified virtual machine on the virtual computer system to a qualified new virtual machine that emulates the first processor of the first type on a new virtual computer system, wherein the new virtual computer system has a third processor of a third processor type that is different from the second processor of the second processor type on the virtual computer system.

14. The method of claim 8 further comprising:
creating the virtual machine to emulate the first processor of the first processor type when the virtual machine is run on any processor of the first processor type.

15. The method of claim 8 further comprising:
modifying the virtual machine to form a modified virtual machine that is compatible with a third processor of a third processor type and to run on the third processor using another operating system of another operating type.

16. The method of claim 15 further comprising:
verifying the modified virtual machine on the third processor of the third processor type.

17. The method of claim 16 further comprising:
running the application testing tool on the modified virtual machine, which is running on the third processor without needing to requalify the application testing tool.

18. A method for testing application software for installation on an aircraft hardware platform using virtual computer systems, the method comprising:
verifying an application testing tool using a tool qualifier module running on a physical computer system having a first processor of a first processor type and a first operating system of a first operating type running on the first processor of the first processor type to qualify the application testing tool;
establishing a benchmark performance for the physical computer system;
verifying a virtual machine in a virtual computer system using a qualifier module to determine whether a performance of the virtual machine is consistent with the benchmark performance of the physical computer system within selected tolerances to thereby form a qualified virtual machine, the virtual computer system comprising:
- a second processor of a second processor type;
- a second operating system of a second operating type running on the second processor of the second processor type;
- the virtual machine emulating the first processor of the first processor type and running on the second processor of the second processor type; and
- a third operating system of the first operating type running on the virtual machine; and transferring the application testing tool, after the application testing tool has been qualified, from the physical computer system to the qualified virtual machine on the virtual computer system, wherein using the application testing tool on the second virtual computer system to test an application program that is to be installed on the aircraft hardware platform does not require requalifying the application testing tool;
testing the application program for installation on the aircraft hardware platform using the application testing tool running on the virtual computer system to determine whether the application program is certifiable without requalifying the application testing tool for use on the virtual computer system; and
installing the application program on the aircraft hardware platform in response to a determination that the application program is certifiable.

19. The method of claim 18 further comprising:
creating the virtual machine to emulate the first processor of the first processor type when the virtual machine is run on any processor of the first processor type.

* * * * *